US012666332B2

(12) United States Patent  
Seetharaman et al.

(10) Patent No.: US 12,666,332 B2  
(45) Date of Patent: Jun. 23, 2026

(54) METHOD AND SYSTEM FOR MAINTAINING SERVICE CONTINUITY OF A ROAMING USER ACROSS MULTIPLE NETWORKS

(71) Applicant: Wipro Limited, Bangalore (IN)

(72) Inventors: Swaminathan Seetharaman, Chennai (IN); Ravi Kumar Emani, Bangalore (IN)

(73) Assignee: Wipro Limited, Bangalore (IN)

( * ) Notice: Subject to any disclaimer, the term of this patent is extended or adjusted under 35 U.S.C. 154(b) by 616 days.

(21) Appl. No.: 17/653,878

(22) Filed: Mar. 8, 2022

(65) Prior Publication Data

US 2023/0224786 A1 Jul. 13, 2023

(30) Foreign Application Priority Data

Jan. 13, 2022 (IN) .............................. 202241002175

(51) Int. Cl.
| | |
|---|---|
| *H04W 36/26* | (2009.01) |
| *H04W 28/24* | (2009.01) |
| *H04W 36/14* | (2009.01) |

(52) U.S. Cl.
CPC ........... *H04W 36/26* (2013.01); *H04W 28/24* (2013.01); *H04W 36/14* (2013.01)

(58) Field of Classification Search
CPC ...... H04W 36/26; H04W 28/24; H04W 36/14
See application file for complete search history.

(56) References Cited

U.S. PATENT DOCUMENTS

| | | | |
|---|---|---|---|
| 11,115,920 B1 * | 9/2021 | Seetharaman | ........ H04W 24/08 |
| 2002/0068571 A1 * | 6/2002 | Ohlsson | .............. H04W 36/185 |
| | | | 455/442 |

(Continued)

OTHER PUBLICATIONS

"3rd Generation Partnership Project; Technical Specification Group Services and System Aspects; Management and orchestration; Provisioning; (Release 16)", 3GPP TS 28.531 V16.0.0 (Dec. 2018), 64 pages.

(Continued)

*Primary Examiner* — Steven S Kelley  
(74) *Attorney, Agent, or Firm* — Finnegan, Henderson, Farabow, Garrett & Dunner, LLP.

(57) ABSTRACT

A method and system for maintaining service continuity of a roaming user across multiple networks is disclosed. The method includes receiving a request for handover of the roaming user from a source network to a target network. The method includes assessing a capability of the target network to accommodate the roaming user arriving from the source network. The method includes performing a Service Level Agreement (SLA) fulfilment negotiation by the target network with the source network. The method further includes configuring the target network to facilitate the handover of the roaming user from the source network to the target network. The method includes transferring the roaming user from the source network to the target network along with the plurality of services. The method includes monitoring efficacy of the service continuity for the transferred roaming user after movement of the roaming user from the source network to the target network.

16 Claims, 7 Drawing Sheets

(56)                    References Cited

U.S. PATENT DOCUMENTS

| 2016/0088636 | A1* | 3/2016 | Zhao | H04W 16/14 |
| | | | | 455/454 |
| 2018/0152958 | A1* | 5/2018 | Arnold | H04L 41/5009 |
| 2019/0327317 | A1* | 10/2019 | Lu | H04L 67/53 |
| 2020/0313983 | A1* | 10/2020 | Stammers | H04L 41/40 |
| 2020/0367129 | A1* | 11/2020 | Raheem | H04L 43/0876 |
| 2022/0131680 | A1* | 4/2022 | Abedini | H04W 28/16 |
| 2022/0201556 | A1* | 6/2022 | Yang | H04W 28/24 |
| 2023/0261942 | A1* | 8/2023 | Hecht | H04L 41/083 |
| | | | | 709/220 |
| 2024/0031790 | A1* | 1/2024 | Poe | H04W 24/02 |

OTHER PUBLICATIONS

"3rd Generation Partnership Project; Technical Specification Group Services and System Aspects; System Architecture for the 5G System; Stage 2 (Release 16)", 3GPP TS 23.501 V16.0.0 (Mar. 2019), 318 pages.

"3rd Generation Partnership Project; Technical Specification Group Services and System Aspects; Management and orchestration; Management of non-public networks; Stage 1 and stage 2 (Release 17)", 3GPP TS 28.557 V1.0.0 (Sep. 2021), 21 pages.

Campolo C, Fontes RDR, Molinaro A, Rothenberg CE, Iera A., "Slicing on the Road: Enabling the Automotive Vertical through 5G Network Softwarization", Sensors (Basel). 2018;18(12):4435. Published Dec. 14, 2018. doi:10.3390/s18124435 (https://www.ncbi.nlm.nih.gov/pmc/articles/PMC6308406/).

* cited by examiner

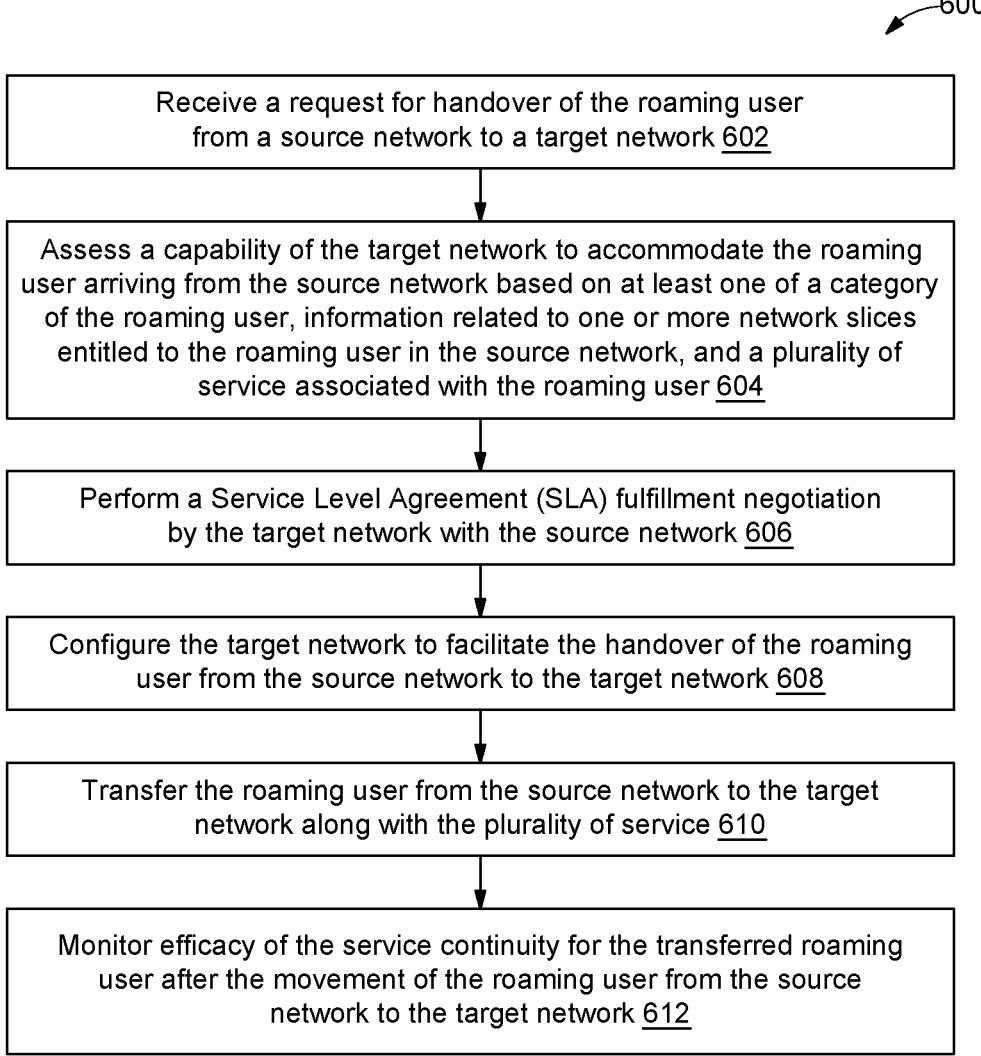

600

Receive a request for handover of the roaming user
from a source network to a target network 602

Assess a capability of the target network to accommodate the roaming
user arriving from the source network based on at least one of a category
of the roaming user, information related to one or more network slices
entitled to the roaming user in the source network, and a plurality of
service associated with the roaming user 604

Perform a Service Level Agreement (SLA) fulfillment negotiation
by the target network with the source network 606

Configure the target network to facilitate the handover of the roaming
user from the source network to the target network 608

Transfer the roaming user from the source network to the target
network along with the plurality of service 610

Monitor efficacy of the service continuity for the transferred roaming
user after the movement of the roaming user from the source
network to the target network 612

FIG. 6

METHOD AND SYSTEM FOR MAINTAINING SERVICE CONTINUITY OF A ROAMING USER ACROSS MULTIPLE NETWORKS

TECHNICAL FIELD

This disclosure relates generally to end-to-end network slicing and more particularly to method and system for maintaining service continuity of a roaming user across multiple networks.

BACKGROUND

Prevalent cellular network (for example, Public Land Mobile Network (PLMN)) operators provide different types and category of services to various class or category of users with varying user entitlements and service priorities. By way of an example, when a user roams from one PLMN network to another, there may be requirements related to sharing of relevant user details and services information from a source network with a target network. While service session continuity and service quality maintenance are primary objectives when the user has to move from the source network to the target network, following additional problems are observed during the movement of the user, that includes: (i) non-interoperability, and security and privacy restrictions between the source network and the target network for sharing of the relevant user details and services information, (ii) inadequate translation of entitlement and classes of the user, service categories, etc., in the target network, based on capabilities of the target network, leading to service session continuity and service quality maintenance issues across networks, and (iii) insufficient or unavailable resources in the target network for serving a roaming user appropriately which may lead to service session continuity and service quality maintenance issues across the networks.

The problems as discussed above may be applicable when the user moves from a source network PLMN to a target network PLMN and when the user moves from a private source network to the target network PLMN (or vice versa). Further, during the movement of the user from the private source network to the target network PLMN, security and privacy restrictions aspects related to sharing of the relevant user information and services information may be taken into consideration. This may limit service session continuity and service quality maintenance issues across the networks.

In context of a network with network slicing topology, the above-mentioned problems may be further aggravated due to some reasons including information sharing involving interoperability issues, inadequate determination (translation) of appropriate user class, service category, service characteristics, user characteristics, and Service Level Agreements (SLAs), and unavailability of resources. Currently, some of the existing mechanisms disclosed includes providing of network slicing support in roaming scenarios, addressing of the user in a private (non-public) network by allocating a network slice to the private network that is typical for an enterprise, and a mechanism of communication between a slice-orchestrators in home and visited networks for exchanging SLA information to determine a most appropriate slice.

However, none of the existing mechanism are capable of assessing feasibility provided by the source network to allow roaming of the user provided by the target network based on dynamic network conditions in the target network. Moreover, none of the existing mechanisms are capable of determining appropriate network slice for user roaming in the target network considering services, entitlements, and impact on existing users in the target network. This may be because no information about availability of the resources is shared by the target network to the source network. Further, none of the existing mechanisms are capable of ensuring service continuity and SLA compliance when there are insufficient resources in existing network slices or when a new network slice for the service(s) to be offered to the roaming user is to be created.

Other available solutions suffer from multiple limitations while providing a network slicing support during roaming scenarios. One such limitation. However, when Slice Differentiator (SD) is different and is not disclosed, an inappropriate S-NSSAI without additional inputs may be assigned to the Roaming User Equipment (RO-UE) leading to service quality maintenance issues.

Another limitation may be when an SLA is mentioned for non-standard S-NSSAIs and may not be elaborated sufficiently. For example, when there is no suitable match in the VPLMN, a mismatch in template hierarchy (or slice hierarchical constituents) and multiple SDs may exist. Further, the matching S-NSSAI in the VPLMN may not cater to the RO-UE (due to resource constraints, shareability limitations, policy, etc.). This gap may lead to an inappropriate S-NSSAI being allocated to the RO-UE, service denial or requiring manual intervention in Home Public Land Mobile Network (HPLMN) and Visited Public Land Mobile Network (VPLMN) leading to delays in service resumption for the RO-UE.

In addition, there may be scenarios where multiple matches may exist for a given S-NSSAI in a visited network. In such scenarios, the mechanism may be chosen is not elaborated by the solution and may lead to inappropriate S-NSSAI allocation to the RO-UE. Further, if no exact match exists, the available solution may not disclose whether the VPLMN should instantiate a new slice or modify an existing slice. Without a proper mechanism to handle this scenario, the available solution may lead to occurrence of service quality maintenance issues for the RO-UE and for the users being served by the S-NSSAI that is chosen. In addition, aspects such as priority, pre-emption and security and privacy restrictions may be compromised.

Further, the solution has additional limitations related to such as non-addressing of the scenario when the UE is moving between a private 5G network and a public 5G network. The solution may provide aspects of re-assignment of the S-NSSAI. However, the solution fails to address the following challenges related to details of how a re-assignment of the S-NSSAI may be done appropriately if the UE was served by the S-NSSAI which constituted the private network leading to service quality maintenance issues due to allocation of an inappropriate S-NSSAI, service continuity and/or delay in service resumption when the UE moves from a private network to the public network, and delay in service resumption for a RO-UE due to slice instantiation, feasibility check, modifications, etc.

Another solution to address the users in a private (non-public) network may be based on a concept when a network slice is allocated to the private network that is typical for an enterprise. However, this approach may not always be possible, and further, the S-NSSAI reassignment and service continuity issues may persist.

Yet another available solution proposes a mechanism of communication between slice orchestrators in home and visited networks for exchanging SLA information to determine a most appropriate slice. However, it does not disclose any details of the SLA information exchange related to how an appropriate slice is determined, and what happens if there are no suitable slices available at the specified time. This may lead to inappropriate slice allocation to RO-UE and/or service quality maintenance issues. This solution only considers the specific case of a network slice for V2X communication, and not about other services. Further, it also does not address analysis of potential impacts to existing users of the slice being allocated to the RO-UE, and the security and privacy restrictions needs of the RO-UE.

Therefore, the existing mechanisms and solutions fails to provide an effective mechanism for ensuring service continuity as the RO-UE moves from the source network to the target network while ensuring that existing users of the target network are not adversely impacted. Thus, there is a need for an effective mechanism for maintaining service continuity of the roaming user across multiple networks while ensuring that the existing users of the target network are not adversely impacted.

SUMMARY

In one embodiment, a method for maintaining service continuity of a roaming user across multiple networks is disclosed. The method may include receiving a request for handover of the roaming user from a source network to a target network. The method may further include assessing a capability of the target network to accommodate the roaming user arriving from the source network based on at least one of a category of the roaming user, information related to one or more network slices entitled to the roaming user in the source network, and a plurality of services associated with the roaming user. The method may further include performing a Service Level Agreement (SLA) fulfilment negotiation by the target network with the source network. The SLA fulfilment negotiation may be performed based on the assessed capability of the target network and the plurality of services associated with the roaming user. The method may further include configuring the target network to facilitate the handover of the roaming user from the source network to the target network. The method may further include transferring the roaming user from the source network to the target network along with the plurality of services. The method may further include monitoring efficacy of the service continuity for the transferred roaming user after the movement of the roaming user from the source network to the target network.

In another embodiment, a system for maintaining service continuity of a roaming user across multiple networks is disclosed. The system includes a processor and a memory communicatively coupled to the processor. The memory includes processor executable instructions, which, on execution, cause the processor to receive a request for handover of the roaming user from a source network to a target network. The processor executable instructions further cause the processor to assess a capability of the target network to accommodate the roaming user arriving from the source network based on at least one of a category of the roaming user, information related to one or more network slices entitled to the roaming user in the source network, and a plurality of services associated with the roaming user. The processor executable instructions further cause the processor to perform a Service Level Agreement (SLA) fulfilment negotiation by the target network with the source network. The SLA fulfilment negotiation may be performed based on the assessed capability of the target network and the plurality of services associated with the roaming user. The processor executable instructions further cause the processor to configure the target network to facilitate the handover of the roaming user from the source network to the target network. The processor executable instructions further cause the processor to transfer the roaming user from the source network to the target network along with the plurality of services. The processor executable instructions further cause the processor to monitor efficacy of the service continuity for the transferred roaming user after the movement of the roaming user from the source network to the target network.

In yet another embodiment, a non-transitory computer-readable storage medium is disclosed. The non-transitory computer-readable storage medium having stored thereon, a set of computer-executable instructions causing a computer comprising one or more processors to perform the steps comprising receiving a request for handover of the roaming user from a source network to a target network; assessing a capability of the target network to accommodate the roaming user arriving from the source network based on at least one of a category of the roaming user, information related to one or more network slices entitled to the roaming user in the source network, and a plurality of services associated with the roaming user; performing a Service Level Agreement (SLA) fulfilment negotiation by the target network with the source network, wherein the SLA fulfilment negotiation is performed based on the assessed capability of the target network and the plurality of services associated with the roaming user; configuring the target network to facilitate the handover of the roaming user from the source network to the target network; transferring the roaming user from the source network to the target network along with the plurality of services; and monitoring efficacy of the service continuity for the transferred roaming user after the movement of the roaming user from the source network to the target network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 is a flowchart of a method for maintaining service continuity of a roaming user across multiple networks, in accordance with some embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
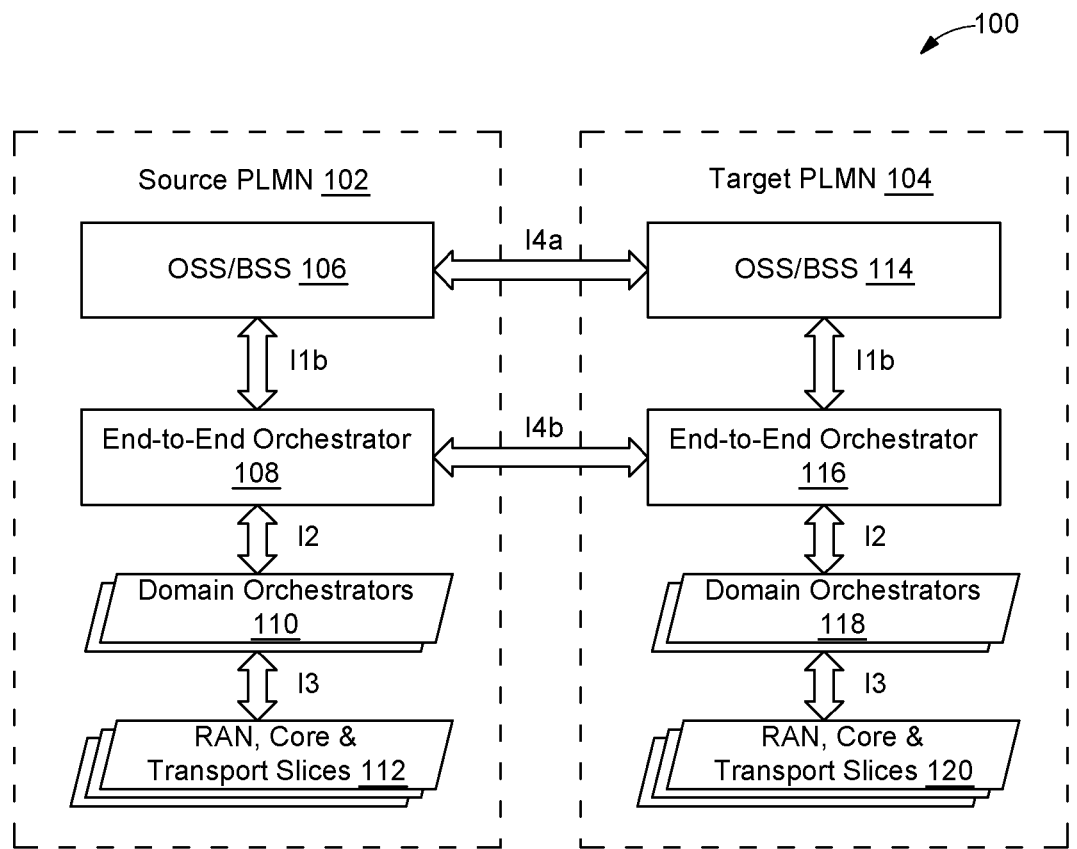
FIG. 1 is a block diagram depicting an end-to-end view for maintaining service continuity of a user roaming from a source Public Land Mobile Network (PLMN) to a target PLMN, in accordance with some embodiment.

Referring now to FIG. 1, a block diagram 100 depicting an end-to-end view for maintaining service continuity of a user roaming from a source Public Land Mobile Network (PLMN) 102 to a target PLMN 104 is depicted, in accordance with some embodiment. The source PLMN 102 may include an Operations Support System and Business Support System (OSS/BSS) 106, an end-to-end orchestrator 108, a set of domain orchestrators 110, and a plurality of Radio Access Network (RAN), core, and transport slices 112.

For the source PLMN 102, the OSS/BSS 106 may be logically connected to the end-to-end Orchestrator 108 using a 'I1b' interface. The 'I1b' interface may be used to provide provisioned inputs for end-to-end network slice and service orchestration including service requests, SLA updates, etc. Further, the end-to-end orchestrator 108 may be connected to the set of domain orchestrators 110 via an 'I2' interface. The 'I2' interface may be between the end-to-end orchestrator 108 and the set of domain orchestrators (also referred as controllers) 110 for orchestrating network slice subnet instances and services running on them. Further, the set of domain orchestrators 110 in the source PLMN 102 may be connected to the plurality of RAN, core, and transport slices 112 using an 'I3' interface. The 'I3' interface is an interface between the domain orchestrators/controllers and the slice sub-net instances (i.e., network functions, links, etc.).

As is illustrated, in FIG. 1, the target PLMN 104 may include an OSS/BSS 114, an end-to-end orchestrator 116, a set of domain orchestrators 118, and a plurality of RAN, core, and transport slices 120. In the target PLMN 104, the OSS/BSS 114 may be logically connected to the end-to-end orchestrator 116 using the 'I1b' interface. The 'I1b' interface may be used to provide provisioned inputs for end-to-end network slice and service orchestration including service requests, SLA updates, etc. In the target PLMN 104, the 'I1b' interface may be enhanced for the end-to-end orchestrator 116 to know about a roaming user and services associated with the roaming user in order to negotiate service fulfillment by the target PLMN 104. These requests may be appropriately translated and sent by the OSS/BSS 114 to the source PLMN 102. Further, the OSS/BSS 114 in the target PLMN 104 may forward the response (received from the OSS/BSS 106 of the source PLMN 102) to the end-to-end orchestrator 116 in the target PLMN 104 over the 'I1b' interface.

For the target PLMN 104, the end-to-end Orchestrator 116 may be connected to the set of domain orchestrators 118 via the 'I2' interface. Further, the set of domain orchestrators 118 in the target PLMN 104 may be connected to the plurality of RAN, core, and transport slices 120 using the 'I3' interface. The OSS/BSS 106 in the source PLMN 102 may have a logical connection to the OSS/BSS 114 in the target PLMN 104 over an 'I4a' interface. In addition to its existing usage, i.e., bilateral agreements, etc., the 'I4a' interface may be used to exchange information about the roaming user and the associated services. Further, the 'I4a' interface may be used to negotiate fulfillment of the associated services and user entitlements of the roaming user by the target PLMN 104.

Further, the end-to-end orchestrator 108 in the source PLMN 102 may have a logical connection to the end-to-end orchestrator 116 in the target PLMN 104 over a 'I4b' interface. In addition to existing usage of the 'I4b' interface, the 'I4b' interface may be used to exchange information about the roaming user moving into a coverage area of the target PLMN 104 from a private source network and the associated services. Further, the interface 'I4b' may be used to negotiate the fulfillment of the associated services and the user entitlements of the roaming user by the target PLMN 104. It may be noted that the illustrated interconnections are logical and may actually involve multiple hops (via intermediate networks) depending on an availability of direct connection links between the source PLMN 102 (also referred as source network) and the target PLMN 104 (also referred as target network).

Figure 2:
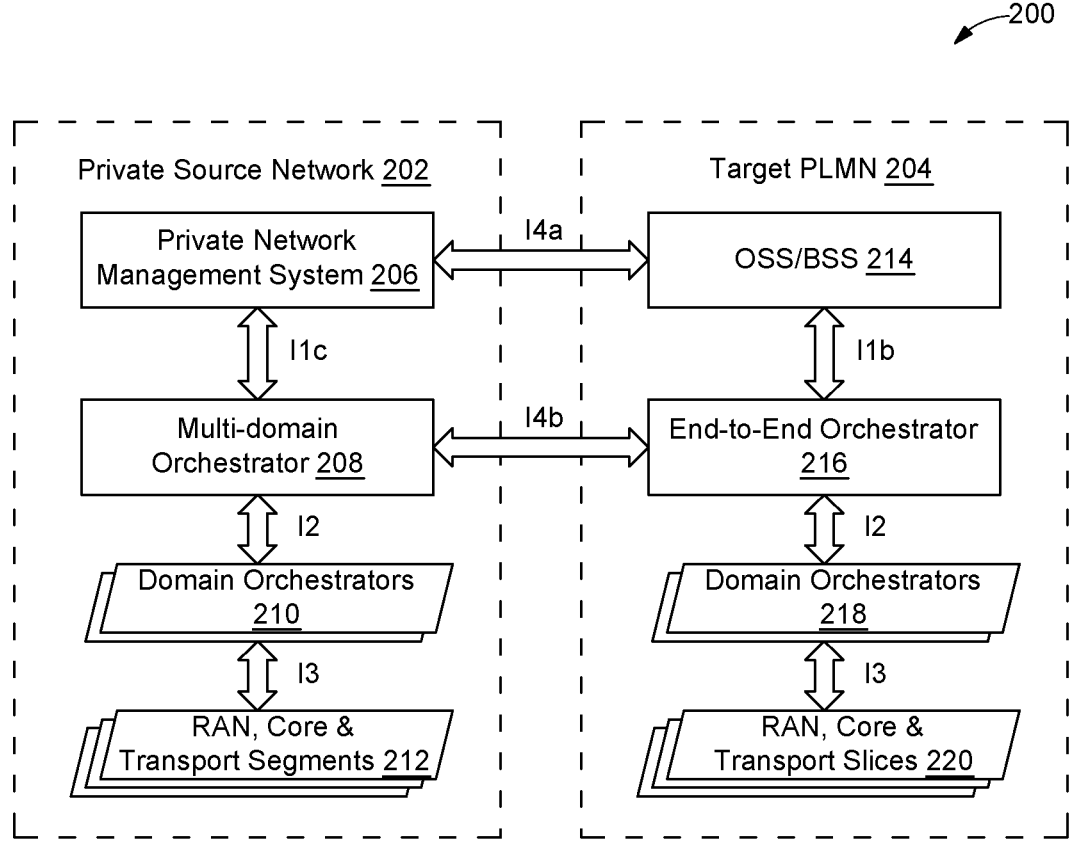
FIG. 2 is a block diagram depicting an end-to-end view of maintaining service continuity of a user roaming from a private source network to a target PLMN, in accordance with some embodiment.

Referring now to FIG. 2, a block diagram 200 depicting an end-to-end view for maintaining service continuity of a user roaming from a private source network 202 to a target PLMN 204 is depicted, in accordance with some embodiment. As is depicted in FIG. 2, the private source network 202 may have a private network management system 206, a multi-domain orchestrator 208, a set of domain orchestrators 210 and a plurality of RAN, core, and transport segments 212. The target PLMN 204 may include an OSS/BSS 214, an end-to-end orchestrator 216, a set of domain orchestrators 218, and a plurality of RAN, core, and transport slices 220.

In the private source network 202, the private network management system 206 may be logically connected to the multi-domain orchestrator 208 using an 'I1c' interface. Further, the multi-domain orchestrator 208 may be connected to the set of domain orchestrators 210 via the 'I2' interface. In addition, the set of domain orchestrators 210 may be connected to the plurality of RAN, core, and transport slices 220 via an 'I3' interface.

In the target PLMN 204, the OSS/BSS 214 may be connected to the end-to-end orchestrator 216 using the 'I1b' interface. Further, the end-to-end orchestrator 216 may be logically connected to the set of domain orchestrators 218 via the 'I2' interface. The set of domain orchestrators 218 may be connected to the plurality of RAN, core, and transport slices 220 via the 'I3' interface.

The private network management system 206 of the private source network 202 may be logically connected to the OSS/BSS 214 of the target PLMN 204 via the 'I4a' interface. Moreover, the multi-domain orchestrator 208 of the private source network 202 may be connected to the end-to-end orchestrator 216 using the 'I4b' interface. It may be noted that the illustrated interconnections are logical and may involve multiple hops (via intermediate networks) depending on an availability of direct connection links between the private source network 202 (also referred as private source PLMN) and the target PLMN 204 (also referred as the target network).

Figure 3:
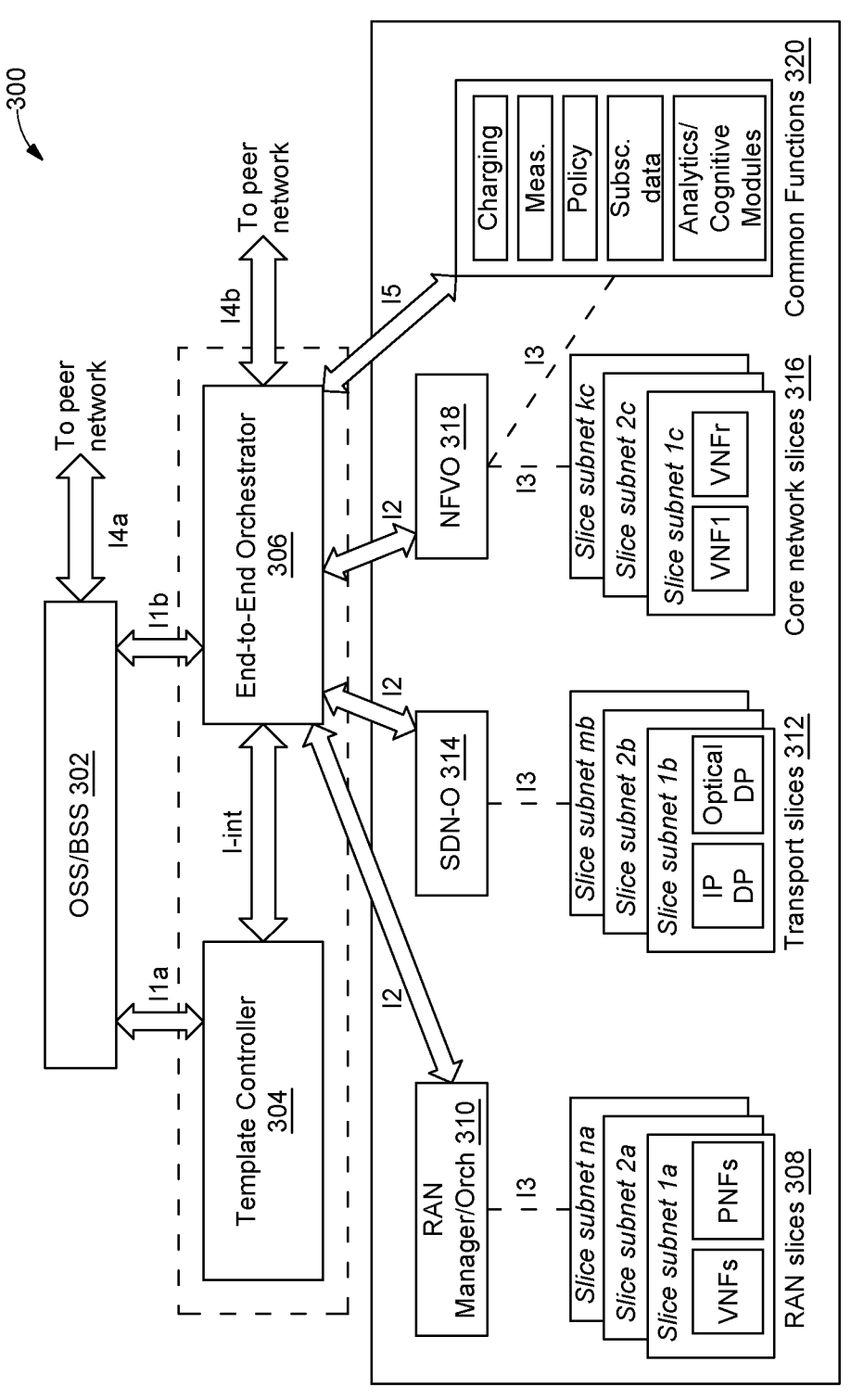
FIG. 3 illustrates a system depicting a network wide view of a target network for maintaining service continuity of a roaming user from a source network to the target network, in accordance with some embodiment.

Referring now to FIG. 3, a system 300 depicting a network wide view of a target network for maintaining service continuity of a roaming user from a source network to the target network is illustrated, in accordance with some embodiment. In reference to FIG. 1 and FIG.2, the target network may correspond to the target PLMN 104 and the target PLMN 204. Additionally, the source network may correspond to one of the source PLMN 102 and the private source network 202. In an embodiment, the target network may correspond to a network to which the roaming user moves from another PLMN. In an embodiment, another PLMN may correspond to the source network or the private source network. As depicted in present FIG. 3, the network wide view of the target network includes an OSS/BSS 302, a template controller 304 and an end-to-end orchestrator 306. In an embodiment, the template controller 304 may be part of the end-to-end orchestrator 306 or may be separate and interconnected to the end-to-end Orchestrator 306 via 'I-int' interface. Further, the target network may include a plurality of RAN slices 308 which are various slice subnet instances (also referred as network slice subnet instances) in RAN and managed/orchestrated by the RAN manager/orchestrator 310. In present embodiment, the various slice subnet instances may be depicted as, a slice subnet instance '1*a*', a slice subnet instance '1*b*', up to a slice subnet instance 'na'. Moreover, the plurality of RAN slices 308 may be connected to RAN manager/orchestration 310 via the interface 'I3'. Additionally, each of the various slice subnet instances may include a Virtual Network Functions (VNFs) and a Physical Network Functions (PNFs).

Further, a plurality of transport slices 312 may include transport slice subnet instances which are orchestrated by a software-defined networking orchestration (SDN-O) 314. In present FIG. 3, the transport slice subnet instances may be depicted as a slice subnet instance '1*b*', a slice subnet instance '2*b*', up to a slice subnet instance 'mb'. Further, each of the plurality of transport slices 312 may be connected to the SDN-O 314 via the interface 'I3'. Moreover, each of the transport slice subnet instances may include an Internet Protocol Data Plane (IPDP) and an optical Data Plane (DP). Moreover, the Internet Protocol Control Plane (IPCP) and Optical Control Plane (Optical CP) may be part of the SDN-O 314 or may be present as separate VNFs.

Further, a plurality of core network slices 316 may be made up of core slice subnet instances which are orchestrated by a network functions virtualization orchestrator (NFVO) 318. In present FIG. 3, the core slice subnet instance may be depicted as a slice subnet instance '1*c*', a slice subnet instance '2*c*', up to a slice subnet instance 'kc'. Moreover, each of the plurality of core network slices 316 may be connected to the NFVO 318 via the interface 'I3'. In addition, each of the core slice subnet instances may include a set of Virtualized Network Functions, i.e., VNF1, . . . , VNFr. In addition, the plurality of RAN slices 308, the plurality of transport slices 312, and the plurality of core network slices 316 may have a set of common network functions (NFs) 320. In other words, they may be common to all the end-to-end network slices. As depicted in the present FIG. 3, the set of common NFs 320 may include, but is not limited to, charging function, measurement function, policy function, subscriber data function, at least one of an analytics module or a cognitive module, Network Slice Selection Function (NSSF), Unified Data Management (UDM), Network Data Analytics Function (NWDAF), and Session Management Function (SMF).

The OSS/BSS 302 of the target network may communicate and exchange information with a corresponding peer network via an 'I4a' interface. In an embodiment, the peer network may correspond to one of the source network or the private source network. The OSS/BSS 302 may communicate with the template controller 304 using an 'I1a' interface and the end-to-end orchestrator 306 using the 'I1b' interface. In an embodiment, the 'I1a' interface between the OSS/BSS

302 and the template controller 304 may be used when the template controller 304 is separate from the end-to-end orchestrator 306. Moreover, the 'I1a' interface may be used to provide operator or provisioned inputs for maintaining network slice and service templates. The end-to-end orchestrator 306 may communicate or exchange information with the peer network using the 'I4b' interface.

It may be noted that, the end-to-end orchestrator 306 may communicate with the RAN manager/orchestrator 310, the SDN-O 314, and the NFVO 318 via the 'I2' interface. The NFVO 318 may communicate with the common NFs 320 via the 'I3' interface. The end-to-end orchestrator 306 may communicate with the common NFs 320 via an 'I5' interface. The 'I5' interface may be an interface between the end-to-end orchestrator 306 of the target network and the common (core) NFs 320. By way of an example, the 'I5' interface may be used by the NSSF to trigger the end-to-end orchestrator 306 for providing details of an appropriate network slice to be used by the roaming user, or the user being handed over from the private source network to the target network. In addition, the 'I5' interface may be used by other common NFs such as UDM, NWDAF, and SMF to know about details of service SLAs associated with the roaming user and agreed with the source network.

Figure 4:
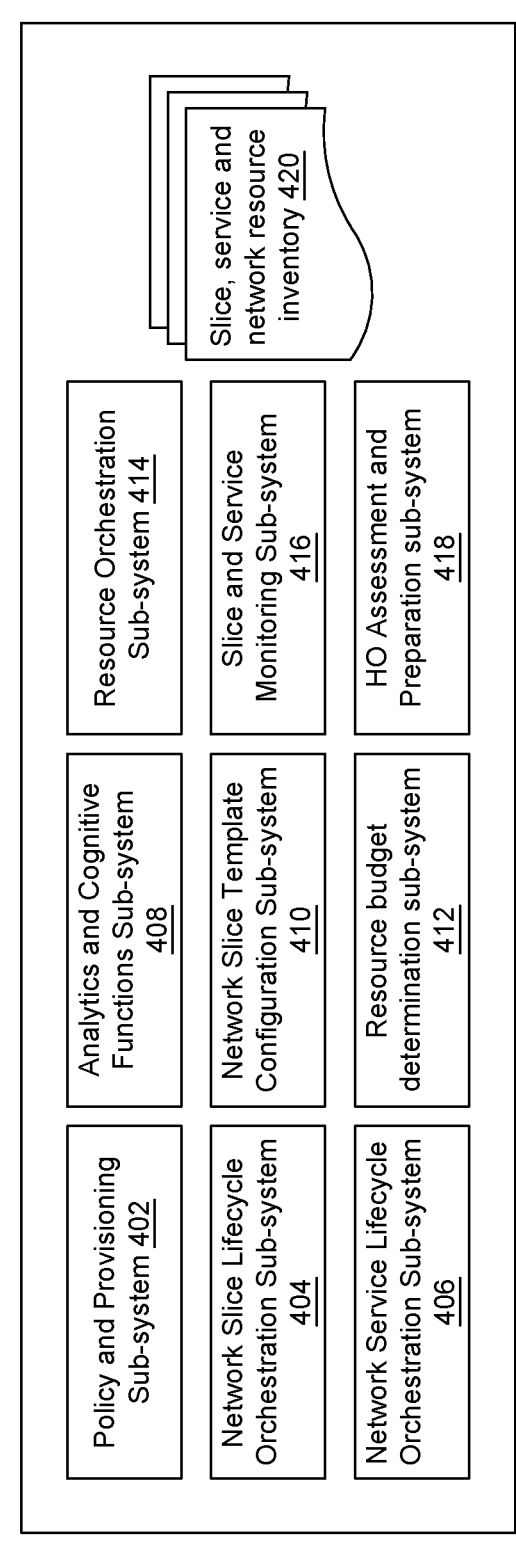
FIG. 4 illustrates a functional block diagram of various modules within an end-to-end orchestrator in a target network for maintaining service continuity of a roaming user across multiple networks, in accordance with some embodiment.

Referring now to FIG. 4, a functional block diagram 400 of various modules within an end-to-end orchestrator in a target network for maintaining service continuity of the roaming user across multiple networks is illustrated, in accordance with some embodiment. In reference to FIG. 1, the end-to-end orchestrator may correspond to the end-to-end orchestrator 116 of the target network 104. The end-to-end orchestrator 116 may include a Policy and Provisioning Sub-system (POPR-SS) 402, a Network Slice Lifecycle Orchestration Sub-system (NSLLO-SS) 404, a Network Service Lifecycle Orchestration Sub-system (NSERLO-SS) 406, an Analytics and Cognitive Functions Sub-system (ACF-SS) 408, a Network Slice Template Configuration Sub-system 410, a Resource budget determination subsystem (RES-BUD-SS) 412, a Resource Orchestration Subsystem (RES-O-SS) 414, a Slice and Service Monitoring Sub-system (SL-SER-MON-SS) 416, a Handover Assessment and Preparation Sub-System (HO-AP-SS) 418 and a Slice, Service, and Network Resource Inventory 420.

The POPR-SS 402 may be responsible for fetching all policy and provisioned inputs from the operator via an OSS/BSS. In reference to FIG. 1, the OSS/BSS may correspond to the OSS/BSS 114. Then, the POPR-SS 402 may send relevant information fetched, to concerned sub-systems present within the end-to-end orchestrator 104. Besides performing existing functionalities, the POPR-SS 402 may obtain inputs from the operator directly or via the OSS/BSS 114. The inputs may be, for example, information about network slice types that the target network may support, initial rules for mapping category of the roaming user, initial predefined thresholds for deciding to create a new network slice instance for the user roaming from another PLMN (i.e., the source network 102) or handed over from the source private network, and initial predefined thresholds for deciding to allow services access for the roaming user.

The NSLLO-SS 404 may be responsible for lifecycle orchestration of network slice instances, starting from instantiation, activation, monitoring (compliance to network slice SLAs), modification (including scaling and healing), and finally termination. In addition to existing functions of the NSLLO-SS 404, the NSLLO-SS 404 may obtain relevant information from the HO-AP-SS 418 about services, entitlements, and security and privacy restrictions needs specified for the user roaming from another PLMN, i.e., the source network. The NSLLO-SS 404 may then use the relevant information obtained to determine a most appropriate network slice instance(s) for the specified user. Moreover, when the HO-AP-SS 418 triggers the NSLLO-SS 404, the NSLLO-SS 404 may also initiate instantiation of new network slice instance(s) for the specified user, and/or appropriate scaling or modification of existing network slice instances as required. In order to assess current resource occupancy levels and resource-related modifications, the NSLLO-SS 404 may trigger the RES-O-SS 414.

The NSERLO-SS 406 may be responsible for lifecycle orchestration of network services, starting from instantiation, activation, monitoring (compliance to service SLAs), modification, and finally termination of network services. The NSERLO-SS 406 may typically perform network service instantiation and termination actions based on receiving a trigger from the operator or from the OSS/BSS 114. In an embodiment, the network service modification may be performed by the NSERLO-SS 406 when the service characteristics are modified by the operator or OSS/BSS 114. In addition, the NSERLO-SS 406 may perform network service modification when there is a need of doing scaling or healing either proactively or reactively in order to ensure compliance to service SLAs.

In addition to its existing functions, the NSERLO-SS 406 may obtain relevant information from the HO-AP-SS 418 about the service(s) that are required for the specified user roaming from another PLMN. In case, one or more of these services are required but are not currently instantiated or activated in the target network 104, the NSERLO-SS 406 may instantiate those services in accordance with required characteristics and SLAs as specified by the HO-AP-SS 418. In addition, the NSERLO-SS 406 may be queried by the HO-AP-SS 418 for determining feasibility to cater to specific services and compliance to the associated SLAs within a certain geographic area.

The ACF-SS 408 may be responsible to perform all analytics and cognitive functions responsible for predicting fault and performance issues in the network slice instances and the services. The ACF-SS 408 may also be responsible for learning effectiveness of specific preventive or corrective actions and adapting prescriptions that it comes up with, to address a specific issue in the target network. In addition to its existing functions, the ACF-SS 408 may be triggered by the HO-AP-SS 418 to access the risk associated with assigning the specified user to an existing network slice instance based on security and privacy restrictions requirements of the specified user and that of other users served by the existing network slice instance, taking into account user category and category of services served by the network slice instance.

The RES-BUD-SS 412 may be responsible for determining resource budgets especially when instantiating a network slice or when decomposing an end-to-end network slice's requirement (derived, in turn, from the service's requirements) to network sub-net-level requirements. Further, the determined resource requirement may be used to effectively determine whether an existing network slice instance (and its constituents) will be able to serve a new request or not. In addition to its existing functions, the RES-BUD-SS 412 may also determine appropriate resource budgets when a new network slice is to be instantiated for one or more services required by the roaming user, taking into consideration the user category the service category, etc.

The RES-O-SS 414 may be responsible for resource orchestration including appropriate resource allocation and deallocation to the network slice instances and the service instances. The RES-O-SS 414 may also determine the resources to be allocated to a particular network slice instance or a slice sub-net instance when triggered by the NSLLO-SS 404. In addition to its existing functions, the RES-O-SS 414 may determine feasibility of the resources to be allocated (without actually allocating them) for a new or modified slice when requested by the NSLLO-SS 406 for the roaming user.

The SL-SER-MON-SS 416 may be responsible for monitoring fault and performance of each of the network slice instances, each of the slice subnet instances and service. In addition, the SL-SER-MON-SS 416 may assess compliance of the network slice and service SLAs. Further, the SL-SER-MON-SS 416 may also be responsible for triggering the NSLLO-SS 404 and NSERLO-SS 406 for taking appropriate actions to ensure that the network slice and the service SLAs are complied with. In addition to its existing functions, the SL-SER-MON-SS 416 may monitor the network slice and the service SLAs of the roaming user, as well as whether entitlements of the roaming user are complied with. The SL-SER-MON-SS 416 may then trigger the NSLLO-SS 404 or NSERSLO-SS 406 as appropriate, in case of any violations (proactively as well as reactively depending on a scenario).

The HO-AP-SS 418 is a new sub-system that may perform functions such as interacting with the source network to obtain relevant information about the roaming user and the associated services (directly or through the OSS/BSS), assessing feasibility of catering to the roaming user (both from another PLMN as well as handed over from the source private network) and the associated services based on the user category, types of services, dynamic network conditions, and target network capabilities. In addition, the HO-AP-SS 418 may perform, for example, negotiating with the source network in case of challenges in interpretation and catering to the roaming user (e.g., providing suitable network slices) and fulfillment of the services (e.g., SLA adherence levels), preparing the target network appropriately to cater to the roaming user and the associated services, initiation of necessary preventive and corrective actions based on monitoring of the roaming user and assessing effectiveness of the feasibility assessment, preparation, and adapting to parameters and predefined thresholds.

Figure 5:
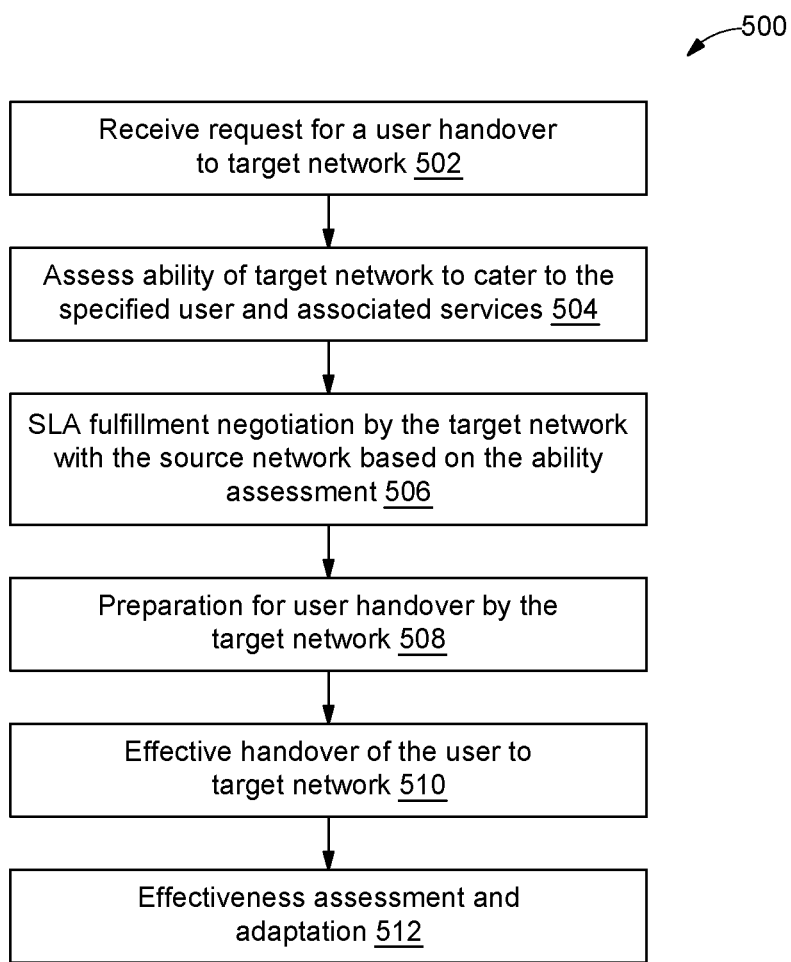
FIG. 5 is a detailed flowchart of a method for maintaining service continuity of a roaming user across multiple networks, in accordance with some embodiment.

Referring now to FIG. 5, a detailed flowchart of a method for maintaining service continuity of a roaming user across multiple networks is illustrated, in accordance with some embodiment. At step 502 a request may be received for a user handover to a target network. In reference to FIG. 1 and FIG. 2, the target network may correspond to the target network 104 and the target network 204. Further, in reference to FIG. 4, the HO-AP-SS 418 in the end-to-end orchestrator of the target network may receive the request for the user roaming from the source network, to be served in the target network. Moreover, the request for the roaming user to be served in the target network may be received from multiple sources. By way of an example, one of the source may be a packet core network segment in the target network via the I5 interface (i.e., a 5G core in a 5G network and an Evolved Packet Core (EPC) in a 4G network). Further, in case of the 5G network that has network slicing, the request for the roaming user to be served in the target network may come from a Network Slice Selection Function (NSSF) in a 5G core network segment. The request may arise when a roaming user's User Equipment (UE) tries to connect to the target network and the target network has a bilateral agreement with the source network belonging to the roaming user or the target network is capable of communicating with the source network of the roaming user.

By way of another example, the request for the roaming user to be served in the target network may come from another source. Another source may be a management and orchestration node in the source network, for example, a service orchestrator. The request may be received from the management and orchestration node via the OSS/BSS in the target network (i.e., over interface4a and interface1b)

In reference to FIG. 4, the request received by the HO-AP-SS 418 may contain information about the user travelling from the source network to the target network. The HO-AP-SS 418 may fetch relevant information about the source network belonging to the user. In an embodiment, the relevant information fetched may correspond to a plurality of services associated with the user. Based on the relevant information fetched, the HO-AP-SS 418 may then initiate steps for assessing whether and how the target network will cater to the user for providing the associated services. As may be appreciated, the relevant information may be stored locally or obtained from the OSS/BSS.

Upon receiving the request, at step 504, an ability of the target network to cater to the user in order to provide the associated services may be assessed. Further, the relevant information associated with the user may be exchanged between the source network and the target network. In reference to FIG. 4, the HO-AP-SS 418 in the end-to-end orchestrator of the target network may interact with the source network to obtain the relevant information about the user and the associated services. As part of the interaction, two scenarios may be possible. In a first scenario, the specified user may be moving from the private source network to the target network. In this case, the end-to-end orchestrator of the target network may interact with a private network orchestration (or equivalent system) to obtain user service information. This interaction may be performed directly over the interface I4b or via the OSS/BSS, i.e., the interface I1b and the interface I4a. In this scenario, the user service information may include information such as user category, service category associated with the user, characteristics and SLAs, currently active services, entitlements, details of the network slice if the user is served on any specific slice, and security and privacy restrictions if any.

In a second scenario, the user may be moving from a carrier network (PLMN) of another service provider or another country to the target network. In this case, the end-to-end orchestrator of the target network may interact with the end-to-end orchestrator of the source network. This interaction may be directly over the interface I4b or via the OSS/BSS, i.e., the interface I1b and the interface I4a. In this scenario, the user service information may include information such as category of user, services associated with the user, characteristics and SLAs, currently active services, entitlements, details of the network slices to which the user is entitled to, security and privacy restrictions of the user and of other users sharing same network slice as of the moving user.

Further, the relevant information received from the source network may be interpreted by the target network. In reference to FIG. 4, the HO-AP-SS 418 may interpret the received information depending on whether the user is moving from the private source network or from another PLMN (i.e., the source network) to the target network. However, mechanism required for interpretation of the relevant information may vary depending upon the source network associated with the user. In one embodiment, when the user moves from private network to the target network, following set of translations may be done by the HO-AP-SS 418 in the end-to-end orchestrator of the target network.

Moreover, for the user category, the set of translations may be based on a plurality of provisioned rules and the private source network may share only limited information due to security and privacy restrictions. Further, the target network (which is the PLMN) may not support fine-grained categorization of the user as would be in the private source network or an enterprise network (for example, based on organization hierarchy and user's department/role in the organization). In the absence of any special information, the user may be treated as a normal user by the target network.

Further, for the service category, the set of translations may be done based on service categories supported by the target network and the SLA information shared by the private source network. In case adequate information is not available, the HO-AP-SS 418 may request for additional information to the private source network directly over the interface I4b or via OSS/BSS using the interface I1b and the interface I4a in order to do the service category translations appropriately. Moreover, if the target network does not have fine-grained service categorization as supported by the private source network, the target network may perform some approximations such that the SLAs are met. Further, for user entitlement, the set of translations may be based on standard rules and involve a direct one-to-one translation.

Further, for security and privacy restrictions, the set of translations may be done in a way that is compatible with the target network. For example, a high security and a high privacy requirement may be translated to allocate an isolated and dedicated network slice for the user with no sharing of resources across all network slices (also referred as network segments) with other user categories. Further, it may also result in fault management (FM) or performance management (PM) and other network-relevant data being abstracted or masked so that the information related to the user is not exposed while ensuring effectiveness of any analysis that may be performed on the user information.

In addition, the HO-AP-SS 418 may also make a note of the network slice (if applicable) that was serving the user when the user was part of the private source network. Moreover, approximations and the set of translations done by the HO-AP-SS 418may be considered during a negotiation phase that is further discussed in subsequent embodiments.

In another embodiment, when the user moves from another PLMN (i.e., the source network) to the target network following mapping may be done by the HO-AP-SS 418 in the end-to-end orchestrator of the target network. For the user category, the set of translations may be based on provisioned rules. Moreover, the source network may share only limited information due to privacy and security restrictions, and regulatory restrictions. Further, the target network may have a different categorization of users as compared to the source network. In absence of any special information, the specified user may be treated as a normal user by the target network.

During movement of the user from another PLMN to the target network, the service category translations may be based on one or more service categories supported by the target network. Further, the service category translations may be based on the SLA information shared by the source network. As may be appreciated, when the adequate information is not available, the HO-AP-SS 418 may request for additional information to the source network directly over the I4b interface or via the OSS/BSS using the I1b interface and the I4a interface, in order to perform the set of translations to be performed appropriately. Further, if the TGT-NTW does not have the service categorization as supported by the source network, the target network may perform some approximations so that the SLAs may be met.

Further, the user entitlement translations may be based on standard rules and involve a direct one-to-one translation. The standard rules may depend on bilateral agreements (if present) between the source network and the target network or default user entitlements provisioned by the operator. Moreover, the information related to the user entitlements may be fetched by the HO-AP-SS 418 from the OSS/BSS via I1b during translation process. In addition to the user entitlement information, information about network slices that the user have accessed may be provided. In case network slice types in the source network and the target network are different (e.g., enhanced as compared to what is specified in 3GPP) and if the source network does not share the information initially, then, the target network may request for the information. The information may include characteristics and SLAs in order to perform accurate translation. It may be noted that, each translation from the set of translations may result in only an approximate match with some service characteristics and/or SLAs being compromised and involve a premium treatment by the target network. Further, the translation may result in no suitable slice type existing in the target network.

Further, the set of translations for the security and privacy restrictions may be performed in a manner that is compatible with the target network. For example, a high security and a high privacy requirement may be translated to allocate an isolated and dedicated network slice for the user with no sharing of resources across all network slices of other user categories. Further, the set of translations for the security and privacy restrictions may result in FM/PM and other network-relevant data being abstracted or masked so that the information of the user is not exposed while ensuring effectiveness of any analysis that may be performed on the information. In addition, the source network may share information about risks of sharing a network slice allocated to the user with other users or services (in general or particular categories). Further, the information about the risk of the sharing the network slice instance may be taken into consideration by the HO-AP-SS 418 during the set of translations.

Moreover, the approximations and the set of translations done by the HO-AP-SS 418 as discussed above in this embodiment, may be considered during negotiation phase for the assessment of the target network ability to cater to the user, and for preparation of the target network to cater to the user. This has been further explained in detail in below paragraphs.

In an embodiment, the assessment may be performed by the target network on its ability to cater to the user and fulfill the services associated with the user roaming from the source network to the target network. One or more of scenarios may be possible when the interpretation of the information received from the source network by the target network is completed. Moreover, generation of the one or more scenarios may be based on the user category and the service(s) category translations, network slice(s) instance(s) translations (in case of the user, roaming from another the source network to the target network), and security and privacy restrictions. In a first scenario, the assessment may be performed by the target network, when the target network has necessary capabilities to cater to the user may be determined. Moreover, in the first scenario, the HO-AP-SS 418 may ascertain if any of new network slice(s) have to be instantiated based on the security and privacy restrictions (after appropriate translation). Once ascertained that the new network slice needs to be instantiated, the HO-AP-SS 418 may check with the NSLLO-SS 404 and RES-O-SS 412 on feasibility (i.e., availability of appropriate resources) by passing the required service(s) and the network slice related information (SLAs, characteristics, etc.). However, when instantiation of the new network slice is not ascertained, the HO-AP-SS 418 may query the NSLLO-SS 404 for feasibility to allocate a suitable network slice in order to cater to the user based on current (and predicted) dynamic network conditions of the target network, and the requirements for the user (user category, service category, SLAs, security and privacy restrictions needs, and user entitlements).

As may be appreciated, the assessment by HO-AP-SS 418 may also take into consideration an impact that may occur to existing users served by the network slice(s). For example, the impact may be determined from the security and privacy restrictions perspective based on the inputs from the source network on potential adverse effects on the existing users. Further, from a resource perspective, the impact may be determined to ensure service SLA adherence to the existing users. The SLA adherence to the existing users may be done by querying the RES-O-SS 414 on predicted traffic patterns (with the help of the ACF-SS 408) and current resource occupancy levels.

It may be noted that, when the HO-AP-SS 418 queries the NSLLO-SS 404 on feasibility of allocating suitable network slice instance(s), the NSLLO-SS 404 may perform multiple actions. The multiple actions may be, for example, determining the template hierarchy, determining whether the existing network slice instance(s) may be used to serve the user and associated services, decomposing the end-to-end network slice requirements for each sub-net (RAN, Core and Transport) and determining appropriate resource budgets, determining whether the existing network slice subnet instance(s) may be used to serve the user and associated services, and lastly, determining if there are sufficient resources in the network slice instance(s) chosen, if the existing network slice instance(s) may be used, and determining if there are sufficient resources available in the slice sub-net instance(s) if new network slice instance(s) have to be allocated.

In a second scenario, the assessment may be performed by the target network on its ability to cater to the user and fulfill its associated services upon determining that the target network has partial capabilities to cater to the user. In this scenario, the HO-AP-SS 418 may perform the assessment of the feasibility of catering to the user and associated services based on its capabilities and dynamic network conditions. Moreover, mechanism for performing the assessment in the second scenario may be similar to those in the first scenario for aspects where the target network may be capable and/or incapable. In furtherance to aspect for which the target network being capable and/or incapable, the HO-AP-SS 418 may identify potential alternatives and any associated impacts. By way of an example, when a particular network slice type is not supported in the target network, a determination may be made related to identification of next best network slice type (exceeding the requirements), implications to the existing users, and taking into account restrictions imposed by the bilateral agreements (if any). Moreover, when the network slice type exceeding the requirements is not available then some types of network slice that may fulfill some of the requirements, implications to existing users, etc., may be considered. Moreover, when there is no suitable network slice type available, a determination may be done for creation of a new template hierarchy by combining two or more hierarchies.

By way of another example, when a particular service category is not supported in the target network than a nearly equivalent service category which is slightly higher or slightly lower with respect to fulfillment of the requirements of the user may be determined. Moreover, when none of the existing service category is suitable for the user, then determination may be performed to combine characteristics and SLAs of two services suitably.

After performing the assessment related to feasibility of catering to the user and associated services, the HO-AP-SS 418 may then ascertain the feasibility of catering to the user from the resource and the network slice instance(s) allocation perspective with help of the NSLLO-SS 404 and the RES-O-SS 414. The feasibility of catering to the user may include assessment of the impact on the existing users, the SLAs of services associated with the existing user, and compliance to security and privacy restrictions requirements.

In a third scenario, the assessment may be performed by the target network to determine its ability to cater to the user and fulfillment of the associated services when the target network does not have capabilities to cater to the user. In this scenario, the HO-AP-SS 418 may prepare a list of possible options that have closest possibilities to fulfill requirements of communication of the user and the associated service(s). The target network may then assess the feasibility of fulfilling the list of possible options from the resource and the network slice instance(s) allocation perspective with help of the NSLLO-SS 404 and the RES-O-SS 414

At step 506, an SLA fulfillment negotiation for the identified user and associated services may be determined based on the assessment. The HO-AP-SS 418 may perform following multiple actions based on first scenario, second scenario, and the third scenario as discussed above. In a first case, the target network may have necessary capabilities to cater to the user. Under the first case, a scenario may be that the target network may have necessary resources and is feasible to serve the user, the associated services at the required SLA levels. Moreover, for the first scenario, no negotiation may be required and the HO-AP-SS 418 in the end-to-end orchestrator of the target network may simply inform the source network or the private source network (for example, directly over the I4b interface or via the OSS/BSS via the I1b interface and the I4a interface) about successful acceptance and fulfillment.

Further, a second scenario under the first case may be that the target network does not have necessary resources. In addition, it may not be feasible or partially feasible for the target network to serve the user, the associated services at the required SLA levels. It may be noted that, for the second scenario, the HO-AP-SS 418 may negotiate with the source network or the private source network (for example, directly over I4b or via the OSS/BSS via the I1b interface and the I4a interface) about the services and the SLA fulfillment levels. The negotiation may involve compromising on some of the services SLAs and/or, security and privacy restrictions requirements within acceptable limits, use of premium resources, or compromising on the ability of the target network temporarily to serve its own users. Moreover, compromising on the security and privacy restrictions requirements and use of premium resources may have an impact on billing systems, hence the OSS/BSS may need to be informed over the I1b interface.

In a second case, the target network may have partial capabilities to cater to the user with the associated services.

In an embodiment, when the target network has partial capabilities, the HO-AP-SS 418 may negotiate with the source network or the private source network about the service and the SLA fulfillment levels, based on capabilities and current feasibility of the target network. The current feasibility may be based on current and predicted resource occupancy levels. The source network may provide feedback on the acceptance of the capability limitations including proposing lower SLAs or other alternatives. Based on this, the HO-AP-SS 418 may again perform the assessment of an ability of the target network to cater to the user and the associated services. The assessment of the ability of the target network may be done to ascertain requirement of an improvement in fulfillment capability of the target network. Based on the requirement determined, feedback may be provided to the source network. Further, the source network may decide whether not to allow the user to roam to the target network or agree on modification of the SLAs for service fulfillment requirements.

Based on the decision of the source network, the target network may either stop further processing and inform requestor that the user may be denied from an access of the target network or may proceed ahead However, if the user decides to proceed ahead and there are feasibility issues in meeting the SLAs or the service fulfillment requirements, then the target network may continue executing the negotiations with the source network. By way of an example, such negotiations may involve compromising on some of the service SLAs, security and privacy requirements within acceptable limits, use of premium resources, or compromising on an ability of the target network temporarily to serve its own users. Moreover, use of the premium resources and compromising on the ability of the target temporarily may have an impact on billing systems, hence the OSS/BSS of the target network may be informed over the I1b interface.

In a third case, the target network may not have capabilities to cater to the associated services of the user. In this case, the HO-AP-SS 418 may provide details of alternative options available to the source network or the private source network. Based on alternative options received, the source network or the private source network may decide to whether to accept one of the provided alternative options or to disallow the user from being served by the target network. Moreover, when the source network disallows the user from being served by the target network, the HO-AP-SS 418 may inform the requestor that the user is not allowed to be served by the target network.

In addition, when the source network selects one or more alternative options, then the HO-AP-SS 418 may ascertain the feasibility of fulfilling the selected options with the help of NSLLO-SS 404 and RES-O-SS 414 Based on the feasibility check, when the service fulfillment is only partially feasible, then the HO-AP-SS 418 may negotiate with the source network. Such negotiation may involve compromising on some of the service SLAs, security and privacy requirements within acceptable limits, use of premium resources, or compromising on an ability of the target network temporarily to serve its own users. It may be noted that, both the security and privacy restrictions requirements and the use of premium resources may have an impact on the billing systems, hence the OSS/BSS of the target network may be informed over 'I1b' interface.

At step 508, the target network may prepare for handover of the user. For performing the handover, one or more updates related to, resource allocation, topology, and configuration required in the target network may be determined. After completion of the negotiation with the source network, the HO-AP-SS 418 may then finalize the modification requirements related to, for example, the user category, the services category and associated SLAs, the security and privacy restrictions requirements. Once the modifications are finalized, the HO-AP-SS 418 may trigger the NSLLO-SS 404 for allocating appropriate network slice instance(s) to serve the user and fulfill the associated services in compliance to the finalized modification requirements. The HO-AP-SS 418 may also inform the NSLLO-SS 404 and RES-O-SS 414 about potential impacts on existing users so that appropriate actions, for example, reconfiguration, scaling, allocating a new slice instance, etc. may be considered by the NSLLO-SS 404/RES-O-SS 414 when determining the appropriate network slice instances or the resources respectively to be allocated to the user. Further, the HO-AP-SS 418 may interact with the RES-O-SS 414 for determining suitable updates to the resource allocation in order to cater to the specified user and the associated services.

In yet another embodiment, the required updates may be implemented in the target network, based on a criterion of minimal impact to other existing users in the target network. It may be noted that, once the updates are provided by the NSLLO-SS 404/RES-O-SS 414 the HO-AP-SS 418 may choose the one or more options involving the minimal impact to existing users and trigger the NSLLO-SS 404/RES-O-SS 414 accordingly. In some cases, the HO-AP-SS 418 may provide level of the impact on the existing users as predefined threshold to the NSLLO-SS 404/RES-O-SS 414 in order to limit number of suitable options provided by the NSLLO-SS 404/RES-O-SS 414 and to ensure that the impacts are strictly within acceptable limits. It may be noted that, the limit may be specified by policy or pre-provisioned inputs and applied in general to all the users and the services. Further, the limit may be specific to the user category or the service type. The HO-AP-SS 418 may then trigger the NSLLO-SS 404/RES-O-SS 414 to perform necessary changes in the targe network with the help of relevant domain orchestrators or controllers.

At step 510, the user may be effectively moved from the source network to the target network along with the associated services. In order to implement effective movement, the user to the target network the HO-AP-SS 418 may inform the requestor, for example, the OSS/BSS or the NSSF about the relevant information of the user, the associated network slice types, the services, and the associated SLAs. Moreover, the HO-AP-SS 418 may inform the relevant network functions of the core network about the services and the associated SLAs for effective service orchestration. The user may then be allowed to connect and register with the target network using mechanism specified in prior art, for example, as specified in 3$^{rd}$ Generation Partnership Project (3GPP, "System architecture for the 5G System (5G5)"). The HO-AP-SS 418 may also inform concerned sub-systems or nodes including the SL-SER-MON-SS 416 in the end-to-end orchestrator and the NWDAF in core network segment of the target network to monitor the service SLA compliance levels and service continuity provided to the user along with health and performance levels of the network slices serving the user. In addition, the HO-AP-SS 418 may provide the predefined thresholds for initiating preventive or corrective actions.

In another embodiment, the service continuity after movement of the user to the target network may be assessed. Based on the input from HO-AP-SS 418, the SL-SER-MON-SS 416 may periodically evaluate (as well as when a fault occurs) the service SLA compliance levels and service continuity provided to the user along with the health and performance levels of the network slices serving the user. This evaluation may be done by the SL-SER-MON-SS 418 with the help of NWDAF or on its own based on the fault and performance data reported by the various network functions of the target network. Moreover, upon determining by the SL-SER-MON-SS 416 that the SLA compliance level or service continuity is below the predefined thresholds that have been negotiated and agreed with the source network, the SL-SER-MON-SS 416 may perform the preventive or corrective actions described in successive paragraphs.

In an embodiment, the preventive or corrective actions may be performed for effective service continuity without any adverse impact on existing users in the target network. Moreover, when the service SLAs of the specified user or the service continuity levels are predicted to fall or actually fall below the predefined threshold due to some failure, the SL-SER-MON-SS 416 may perform an analysis on potential causes and following below described scenarios may be possible based on which the SL-SER-MON-SS 416 may determine appropriate preventive or corrective actions that needs to be performed.

By way of an example, in one scenario, the service SLA and the service continuity levels of the user alone may be below the predefined thresholds, while other existing users on the same network slice (also referred as network segment) may not be facing any problems. In this case, the SL-SER-MON-SS 416 may identify root cause by examining if there is a problem in the network slice being accessed by the user, connectivity of the user to the target network, or any security and privacy restrictions violation, etc. that may be specific to the user. Moreover, the SL-SER-MON-SS 416 may do this analysis on its own or with help of NWDAF. Based on an outcome, the SL-SER-MON-SS 416 may trigger the RAN domain orchestrator or the core domain orchestrator to try and carry out appropriate corrective actions (re-registration, giving higher entitlement temporarily, etc.) to address this problem. In reference to FIG. 3, the RAN domain orchestrator may correspond to RAN orchestrator 310.

By way of another example, in another scenario, the service SLA and the service continuity levels for the same category of users as that of the user may be below the predefined thresholds. This may be due to a resource availability issue in case of shared resources, or may be due to some policy or rules being violated for admission, etc. In this scenario, the SL-SER-MON-SS 416 may trigger a domain orchestrator to determine any issue in their respective network segments and resolve them. In reference to FIG. 2, the domain orchestrator may correspond to the domain orchestrator 218 of the target network 204.

By way of yet another example, in yet another scenario, the service SLA and the service continuity levels for all the users served by the same network slice instance(s) or slice subnet instance(s) may be below the predefined thresholds. This may be due to an issue with the network slice instance(s) or slice sub-net instance(s) serving the user with the fault or performance issues, or the security and privacy restrictions. The SL-SER-MON-SS 41 may trigger the NSLLO-SS 404 for determining appropriate corrective actions to resolve the issue. In this scenario, the appropriate corrective actions may involve scaling of resources, healing of resources, mapping of users or services to different network slice instances, and the like.

By way of yet another example, in another scenario, the service SLA and the service continuity levels of all the users across the network slice instance(s) may be affected due to a network-segment wide or network-wide problem. In this scenario, the SL-SER-MON-SS 416 may trigger the domain orchestrator for inputs from the respective network slice instance (s) segments on the fault or performance issues and identify root cause(s) with help of the domain orchestrator. Based on the root cause identified, the SL-SER-MON-SS 416 may then trigger appropriate corrective actions to address this issue via the domain orchestrator. In reference to FIG. 2, the domain orchestrator may correspond to the domain orchestrator 218 of the target network 204.

At step 512, the service continuity levels effectiveness may be ensured for the user moving from the source network to the target network. To ensure the effectiveness of the user or the service continuity levels across all the users, service category of past handovers for previous users may be assessed. The HO-AP-SS 418 may assess the effectiveness of movement of the user to the target network and the service continuity levels experienced by the user after the movement. Such assessment for the effectiveness of the user movement may be done when the user moves out of the target network coverage or may be done periodically across different users who have moved into or out of the target network and across different services associated with such users. If the effectiveness of movement as measured by service continuity levels is below the predefined thresholds across all the users (on average) for a specific set of services or in general (averaged across all the services), the HO-AP-SS 418 may then carry out the preventive or corrective actions. The preventive or corrective actions performed by the HO-AP-SS 418 has been discussed in subsequent embodiments. It may be noted that the effectiveness analysis of the movement may also include the assessment of impacts on the existing users after the movement. Further, the HO-AP-SS 418 may also get input from the source network on the effectiveness of the service continuity levels in some cases.

In yet another embodiment, the HO-AP-SS 418 may then perform a detailed analysis of the effectiveness and violations of the predefined thresholds violations. In addition, the HO-AP-SS 418 may determine potential preventive or corrective actions. Further, the HO-AP-SS 418 may obtain help from the ACF-SS 408 for performing the assessment and coming up with suitable recommendations.

In an exemplary embodiment, the determination may be made related to whether the effectiveness of the movement was below the predefined threshold for users in a certain geographical region. If yes, then appropriate adjustments to the resource budgets may be made, and appropriate adjustments may be done to resource redundancy levels.

In another exemplary embodiment, the determination may be made related to whether the effectiveness of the movement was below the predefined threshold only for one or more particular service types. In this case, the effectiveness of the network slice instance(s) on which the services were running, and the associated SLA compliance levels may be determined. Based on the SLA compliance levels determined of the underlying network slice instance(s), the parameters and the negotiated thresholds for the network slice instance(s) selection may be adapted which may result in more robust network slice instance(s) being selected for that service.

In yet another exemplary embodiment, the determination may be made related to whether the effectiveness of the movement was below the negotiated threshold due to the known fault or performance issues in the target network or the network slice instance(s). In this case, depending on the user category and the service priority, suitable updates may be done to the parameters and the negotiated thresholds to ensure that an appropriate network slice instance(s) is allocated to the user with sufficient resilience.

Further, in yet another exemplary embodiment, the determination may be performed related to whether the effectiveness of the movement was below the negotiated threshold due to the impact caused by allocating specific network slice instance(s) to the user. The allocation of the specific network slice instance(s) to the user may have led to resource constraints or violation of the security and privacy restrictions requirements for the user due to other existing users. In this case, parameter values for the network slice instance(s) selection for the user may be adapted.

Furthermore, in another exemplary embodiment, the determination may be performed related to whether the service continuity levels of the existing users may be adversely impacted due to one or more user categories, geographical areas, or the network slice instances. In case such deterioration coincides with an allocation of the roaming user to the impacted network slice instances or the slice sub-net instances in the impacted geographical area, or sharing of resources with the roaming user, the criteria for resource sharing and the security and privacy restrictions may be adapted.

After determining possible the preventive or corrective actions, a consistency check may also be performed by the HO-AP-SS 418 along with the ACF-SS 408 to ensure that the determined updates do not contradict or interfere with each other, as well as other changes done very recently which may result in oscillation of network conditions.

In an embodiment, the negotiated thresholds and parameters may be adapted for future movements. After determining the updates and performing the consistency checks, the HO-AP-SS 418 may adapt the negotiated thresholds for future operations. The negotiated thresholds or parameters that may be updated may include those used for capability assessment of the target network to cater to the specified user and the associated services, translation of service SLAs, allocation of a suitable network slice instance to roaming users, resource budget determination for roaming users, and so forth. It may be noted that, the adapted negotiated thresholds and parameters may be used for next cycle of operations, i.e., for future requests to cater to a specified roaming user in the target network.

Referring now to FIG. 6, a flowchart of a method 600 for maintaining service continuity of a roaming user across multiple networks is illustrated, in accordance with some embodiment. At step 602, a request for handover of the roaming user from a source network to a target network may be received by a network device. In an embodiment, each of the source network and the target network may represent a unique public land mobile network (PLMN) of one or more PLMNs provided by a service provider or an enterprise private network. Moreover, the PLMN for the source network may be provided by of a first service provider and the PLMN for the target network may be provided by a second service provider. By way of an example, the handover may be performed for the UE of the roaming user from the source network, i.e., network in which the roaming user initially resides, to the target network, i.e., a network to which the user may be moving to.

Upon receiving the request, at step 604, a capability of the target network to accommodate the roaming user arriving from the source network may be assessed. The assessment may be done based on at least one of a category of the roaming user, information related to one or more network slices entitled to the roaming user in the source network, and a plurality of services associated with the roaming user. In an embodiment, the plurality of services may include, but is not limited to, one or more services associated with the roaming user, one or more characteristics and SLAs of the roaming user, one or more active services associated with the roaming user, security and privacy restrictions of the roaming user and of one or more of users in the target network sharing one or more network slices with the roaming user. By way of an example, the UE of the roaming user may have the associated services as 5G voice services and high-speed data services. Therefore, in order to perform handover of the roaming user from the source network to the target network, assessment of each of the plurality of services associated with the roaming user may be performed.

In an embodiment, in order to assess capability of the target network, initially, the plurality of services associated with the roaming user may be received by the target network from the source network. Upon receiving the plurality of services, each of the plurality of services may be interpreted to assess capability of the target network in order to serve the roaming user while serving the existing one or more users in the target network. In an embodiment, the roaming user may move from one of the source network to the target network and a carrier network of a service provider to the first target network. Further, in order to assess capability, an impact assessment may be done for the at least one existing user sharing the one or more network slices with the roaming user in the target network. In an embodiment, the network slices may correspond to the network slice instances.

Once the assessment is performed, at step 606, SLA fulfilment negotiation may be performed by the target network with the source network. In an embodiment, the SLA fulfilment negotiation may be performed based on the assessed capability of the target network and the plurality of service associated with the roaming user. Moreover, in order to perform the SLA fulfilment negotiation, capability of the target network may be evaluated in order to provide the service continuity to the roaming user, and one or more services associated with the roaming user bound with the performed SLA fulfilment negotiation. In an embodiment, the evaluated capability may be any of a vital capability, a partial capability and a null capability.

Further, at step 608, the target network may be configured to facilitate the handover of the roaming user from the source network to the target network. In order to configure the target network to facilitate the handover, a service requirement set of the roaming user may be determined. In an embodiment, the service requirement set includes updates related to resource allocation, topology, and configuration of the target network. Once the service requirement set is determined, the updates corresponding to the service requirement set may be implemented in the target network while minimally impacting performance of existing one or more of users in the target network.

Once the target network is configured, at step 610, the roaming user may be transferred from the source network to the target network along with the plurality of service. Once the roaming user is transferred, the service continuity may be assessed of the transferred roaming user from the source network to the target network. Based on assessment of the service continuity of the transferred roaming user, one or more actions may be executed in order to maintain the service continuity of the transferred roaming user. In an embodiment, the one or more actions may include any or a combination of re-registration of the transferred roaming user, assigning higher entitlement to the transferred roaming user, resource scaling, resource healing, and mapping of the transferred roaming user to a different network slice. In reference to above FIG. 1-FIG. 5, the one or more actions may correspond to preventive or corrective actions.

Further, at step 612, efficacy of the service continuity for the transferred roaming user may be monitored after the movement of the roaming user from the source network to the target network. In order to monitor the efficacy of the service continuity, effectiveness and service continuity may be assessed for one or more earlier handovers of previous one or more roaming users in the target network. Based on the assessed effectiveness and the service continuity for the one or more earlier handovers, predefined thresholds and parameters corresponding to the target network may be adapted. In reference to FIG. 5, the predefined threshold may correspond to the negotiated threshold.

Figure 7:
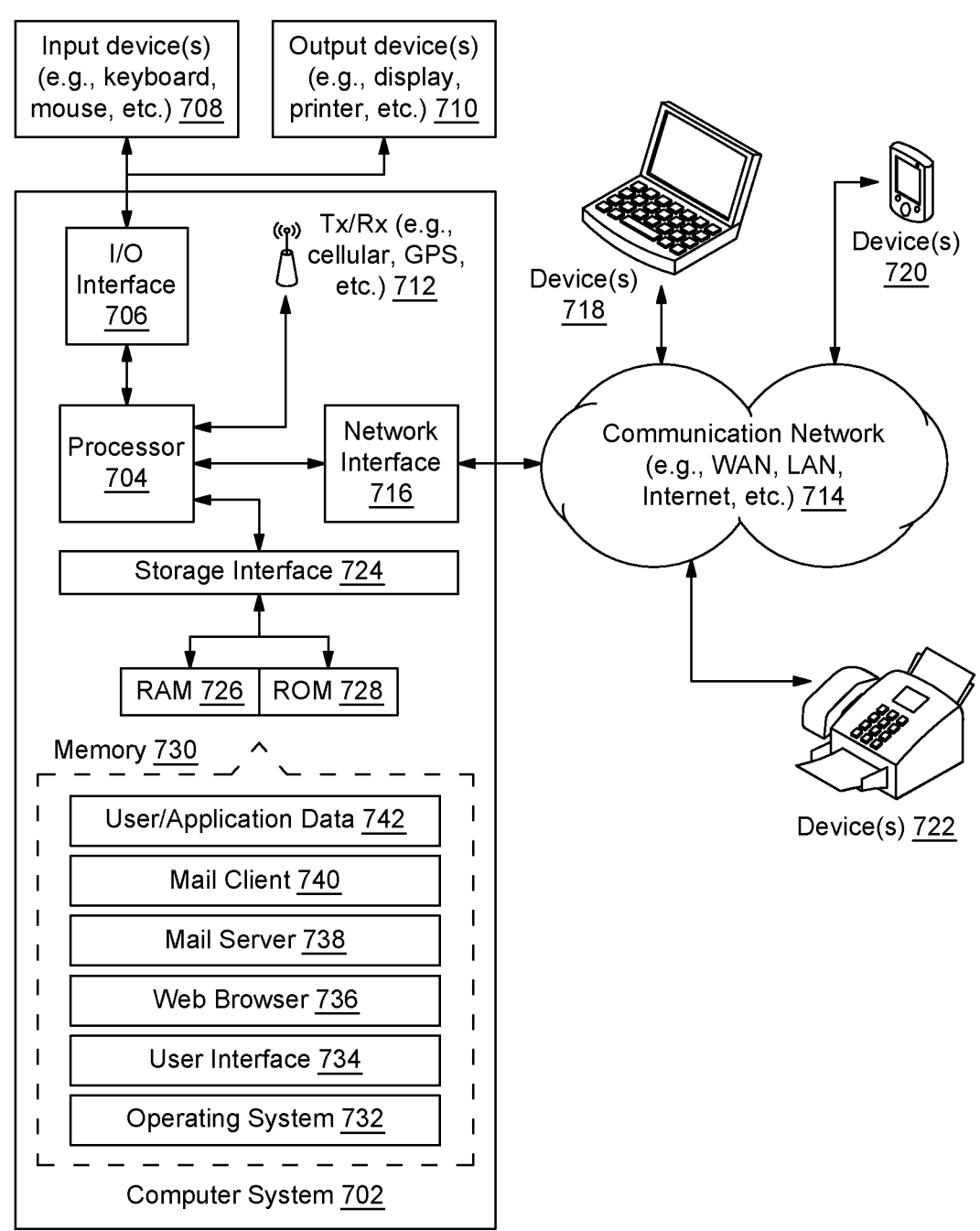
FIG. 7 illustrates a block diagram of an exemplary computer system for implementing embodiments consistent with the present disclosure.

Referring now to FIG. 7, a block diagram of an exemplary computer system for implementing various embodiments is illustrated. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for maintaining service continuity of a roaming user across multiple networks. The method and system may first receive a request for handover of the roaming user from a source network to a target network. The method and system may then assess a capability of the target network to accommodate the roaming user arriving from the source network based on at least one of a category of the roaming user, information related to one or more network slices entitled to the roaming user in the source network, and a plurality of service parameters associated with the roaming user. Further, the method and system may perform a Service Level Agreement (SLA) fulfilment negotiation by the target network with the source network. The SLA fulfilment negotiation may be performed based on the assessed capability of the target network and the plurality of service parameters associated with the roaming user. Moreover, the method and system may configure the target network to facilitate the handover of the roaming user from the source network to the target network. In addition, the method and system may transfer the roaming user from the source network to the target network along with the plurality of service parameters. Thereafter, the method and system may monitor efficacy of the service continuity for the transferred roaming user after the movement of the roaming user from the source network to the target network.

Further, the disclosed method and system may provide various advantages like, the disclosed method and system may ensure the service continuity and maintain the SLA fulfillment negotiation for the identified user and associated services based on an ability assessment. In addition, the target network may be prepared for handover of the identified user. This may be done by determining the updates required in the target network (resource allocation, topology and configuration) and by implementing the required updates in the target network based on criteria of minimal impact to other users in the target network.

Additionally, the disclosed method and system may maintain the service continuity by effectively moving the user from the source network to the target network along with associated services. This may be done by implementing the user movement to the target network, assessing service continuity after user movement to the target network and performing necessary preventive/corrective actions for effective service continuity and for providing no adverse impact to existing users in the target network. Further, the service continuity may be maintained by ensuring effectiveness of service continuity for the RO-UE by assessing effectiveness of user/service continuity (across users, service category) for past handovers and adapting thresholds and parameters for future movements.

The specification has described method and system of maintaining service continuity of a roaming user across multiple networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for maintaining service continuity of a roaming user across multiple networks, the method comprising:

receiving, by a network device, a request for handover of the roaming user from a source network to a target network, wherein the source network and target network are different PLMNs;

assessing, by the network device, a capability of the target network to accommodate the roaming user arriving from the source network based on at least one of a category of the roaming user, information related to one or more network slices entitled to the roaming user in the source network, and a plurality of services associated with the roaming user;

performing, by the network device, a Service Level Agreement (SLA) fulfilment negotiation by the target network with the source network, where the SLA fulfilment negotiation is performed based on the assessed capability of the target network and the plurality of services associated with the roaming user;

configuring, by the network device, the target network to facilitate the handover of the roaming user from the source network to the target network, wherein configuring the target network comprises assessing a level of impact occurring on one or more existing users, wherein the assessment is performed by:

determining, by the network device, the level of impact occurring on the one or more existing users at the target network based on one or more inputs from the source network, wherein the one or more inputs correspond to SLAs of services associated with the one or more existing users, and compliance to security and privacy restrictions requirements;

determining, by the network device, a service requirement set of the roaming user, the service requirement set comprising updates related to resource allocation, topology, and configuration of the target network;

identifying, by the network device, one or more options for implementing one or more updates based on a predefined threshold associated with the level of impact, wherein the level of impact is defined by policy or pre-provisioned inputs;

triggering, by the network device, the one or more updates to perform one or more changes at the target network based on the identified one or more options; and implementing, by the network device, the one or more updates corresponding to the service requirement set in the target network while minimally impacting performance of the one or more existing users in the target network;

transferring, by the network device, the roaming user from the source network to the target network along with the plurality of services; and monitoring, by the network device, efficacy of the service continuity for the transferred roaming user after the movement of the roaming user from the source network to the target network by assessing effectiveness and service continuity for one or more earlier handovers of previous one or more roaming users in the target network; and changing predefined thresholds and parameters of the transferred roaming user's connection in the target network, based on the assessed effectiveness and the service continuity for the one or more earlier handovers.

2. The method of claim 1, wherein the plurality of services comprises one or more services associated with the roaming user, one or more characteristics and SLAs of the roaming user, one or more active services associated with the roaming user, and security and privacy restrictions of the roaming user and of one or more of users in the target network sharing the one or more network slices with the roaming user.

3. The method of claim 1, wherein assessing the capability of the target network comprises:

receiving the plurality of service parameters associated with the roaming user from the source network to the target network; and interpreting the received plurality of service parameters to assess capability of the target network to serve the roaming user while serving the one or more existing users in the target network, wherein the roaming user moves from one of the source network to the target network and a carrier network of a service provider to a first target network; and assessing the level of impact of the one or more existing users sharing the one or more network slices with the roaming user in the target network.

4. The method of claim 1, wherein performing the SLA fulfilment negotiation comprises:

evaluating capability of the target network to provide the service continuity to the roaming user, and one or more services associated with the roaming user bound with the performed SLA fulfilment negotiation, wherein the evaluated capability is any of a vital capability, a partial capability and a null capability.

5. The method of claim 1, wherein transferring the roaming user from the source network to the target network comprises:

assessing the service continuity of the transferred roaming user from the source network to the target network; and executing one or more actions for maintaining the service continuity of the transferred roaming user, wherein the one or more actions comprises any or a combination of re-registration of the transferred roaming user, assigning higher entitlement to the transferred roaming user, resource scaling, resource healing, and mapping of the transferred roaming user to a different network slice.

6. The method as claimed in claim 1, wherein each of the source network and the target network represents a unique public land mobile network (PLMN) of one or more PLMNs provided by a service provider or an enterprise private network, and wherein the PLMN for the source network is provided by a first service provider and the PLMN for the target network is provided by a second service provider.

7. A system for maintaining service continuity of a roaming user across multiple networks, the system comprising at least one processor; and a memory communicatively coupled to the processor, wherein the memory stores processor executable instructions, which, on execution, causes the processor to:

receive a request for handover of the roaming user from a source network to a target network, wherein the source network and target network are different PLMNs;

assess a capability of the target network to accommodate the roaming user arriving from the source network based on at least one of a category of the roaming user, information related to one or more network slices entitled to the roaming user in the source network, and a plurality of services associated with the roaming user;

perform a Service Level Agreement (SLA) fulfilment negotiation by the target network with the source network, wherein the SLA fulfilment negotiation is performed based on the assessed capability of the target network and the plurality of services associated with the roaming user;

configure the target network to facilitate the handover of the roaming user from the source network to the target network, wherein configuring the target network comprises assessing a level of impact occurring on one or more existing users, wherein the assessment is performed by:

determining the level of impact occurring on the one or more existing users at the target network based on one or more inputs from the source network, wherein the one or more inputs correspond to SLAs of services associated with the one or more existing users, and compliance to security and privacy restrictions requirements;

determining a service requirement set of the roaming user, the service requirement set comprising updates related to resource allocation, topology, and configuration of the target network;

identifying one or more options for implementing one or more updates based on a predefined threshold associated with the level of impact, wherein the level of impact is defined by policy or pre-provisioned inputs;

triggering the one or more updates to perform one or more changes at the target network based on the identified one or more options; and implementing the one or more updates corresponding to the service requirement set in the target network while minimally impacting performance of the one or more existing users in the target network;

transfer the roaming user from the source network to the target network along with the plurality of services; and monitor efficacy of the service continuity for the transferred roaming user after the movement of the roaming user from the source network to the target network by assessing effectiveness and service continuity for one or more earlier handovers of previous one or more roaming users in the target network; and changing predefined thresholds and parameters of the transferred roaming user's connection in the target network, based on the assessed effectiveness and the service continuity for the one or more earlier handovers.

8. The system of claim 7, wherein the plurality of services comprises one or more services associated with the roaming user, one or more characteristics and SLAs of the roaming user, one or more active services associated with the roaming user, and security and privacy restrictions of the roaming user and of one or more of users in the target network sharing the one or more network slices with the roaming user.

9. The system of claim 7, wherein, to assess the capability of the target network, the processor executable instructions further cause the processor to:

receive the plurality of service parameters associated with the roaming user from the source network to the target network; and interpret the received plurality of service parameters to assess capability of the target network to serve the roaming user while serving the one or more existing users in the target network, wherein the roaming user moves from one of the source network to the target network and a carrier network of a service provider to the first target network; and assessing the level of impact of the one or more existing users sharing the one or more network slices with the roaming user in the target network.

10. The system of claim 7, wherein, to perform the SLA fulfilment negotiation, the processor executable instructions further cause the processor to:

evaluate capability of the target network to provide the service continuity to the roaming user, and one or more services associated with the roaming user bound with the performed SLA fulfilment negotiation, wherein the evaluated capability is any of a vital capability, a partial capability and a null capability.

11. The system of claim 7, wherein, to transfer the roaming user from the source network to the target network, the processor executable instructions further cause the processor to:

assess the service continuity of the transferred roaming user from the source network to the target network; and execute one or more actions for maintaining the service continuity of the transferred roaming user, wherein the one or more actions comprises any or a combination of re-registration of the transferred roaming user, assigning higher entitlement to the transferred roaming user, resource scaling, resource healing, and mapping of the transferred roaming user to a different network slice.

12. The system as claimed in claim 7, wherein each of the source network and the target network represents a unique public land mobile network (PLMN) of one or more PLMNs provided by a service provider or an enterprise private network, and wherein the PLMN for the source network is provided by a first service provider and the PLMN for the target network is provided by a second service provider.

13. A non-transitory computer-readable storage medium for maintaining service continuity of a roaming user across multiple networks, having stored thereon, a set of computer-executable instructions causing a computer comprising one or more processors to perform steps comprising:

receiving a request for handover of the roaming user from a source network to a target network, wherein the source network and target network are different PLMNs;

assessing a capability of the target network to accommodate the roaming user arriving from the source network based on at least one of a category of the roaming user, information related to one or more network slices entitled to the roaming user in the source network, and a plurality of services associated with the roaming user;

performing a Service Level Agreement (SLA) fulfilment negotiation by the target network with the source network, where the SLA fulfilment negotiation is performed based on the assessed capability of the target network and the plurality of services associated with the roaming user;

configuring the target network to facilitate the handover of the roaming user from the source network to the target network, wherein configuring the target network comprises assessing a level of impact occurring on one or more existing users, wherein the assessment is performed by:

determining the level of impact occurring on the one or more existing users at the target network based on one or more inputs from the source network, wherein the one or more inputs correspond to SLAs of services associated with the one or more existing users, and compliance to security and privacy restrictions requirements;

determining, by the network device, a service requirement set of the roaming user, the service requirement set comprising updates related to resource allocation, topology, and configuration of the target network;

identifying one or more options for implementing one or more updates based on a predefined threshold associated with the level of impact, wherein the level of impact is defined by policy or pre-provisioned inputs;

triggering the one or more updates to perform one or more changes at the target network based on the identified one or more options; and implementing, by the network device, the one or more updates corresponding to the service requirement set in the target network while minimally impacting performance of the one or more existing users in the target network;

transferring the roaming user from the source network to the target network along with the plurality of services; and monitoring efficacy of the service continuity for the transferred roaming user after the movement of the roaming user from the source network to the target network by assessing effectiveness and service continuity for one or more earlier handovers of previous one or more roaming users in the target network; and changing predefined thresholds and parameters of the transferred roaming user's connection in the target network, based on the assessed effectiveness and the service continuity for the one or more earlier handovers.

14. The non-transitory computer-readable storage medium of claim 13, wherein the plurality of services comprises one or more services associated with the roaming user, one or more characteristics and Service Level Agreements (SLAs) of the roaming user, one or more active services associated with the roaming user, and security and privacy restrictions of the roaming user and of one or more of users in the target network sharing the one or more network slices with the roaming user.

15. The non-transitory computer-readable storage medium of claim 13, wherein assessing the capability of the target network comprises:

receiving the plurality of service parameters associated with the roaming user from the source network to the target network; and interpreting the received plurality of service parameters to assess capability of the target network to serve the roaming user while serving the existing one or more of users in the target network, wherein the roaming user moves from one of the source network to the target network and a carrier network of a service provider to the first target network; and assessing the level of impact of the one or more existing users sharing the one or more network slices with the roaming user in the target network.

16. The non-transitory computer-readable storage medium of claim 13, wherein performing the SLA fulfilment negotiation comprises:

evaluating capability of the target network to provide the service continuity to the roaming user, and one or more services associated with the roaming user bound with the performed SLA fulfilment negotiation, wherein the evaluated capability is any of a vital capability, a partial capability and a null capability.

* * * * *